(12) United States Patent
Gernert

(10) Patent No.: US 6,430,024 B1
(45) Date of Patent: Aug. 6, 2002

(54) CAPACITOR WITH HEAT PIPE COOLING

(75) Inventor: Nelson J. Gernert, Elizabethtown, PA (US)

(73) Assignee: Thermal Corp., Stanton, DE (US)

( * ) Notice: Subject to any disclaimer, the term of this patent is extended or adjusted under 35 U.S.C. 154(b) by 0 days.

(21) Appl. No.: 09/775,729

(22) Filed: Feb. 5, 2001

(51) Int. Cl.[7] ................................................ H01G 4/32
(52) U.S. Cl. ........................ 361/302; 361/517; 361/535
(58) Field of Search ............................ 361/274.2, 274.3, 361/517, 518, 519, 301.3, 302, 535, 536, 537

(56) References Cited

U.S. PATENT DOCUMENTS

| | | |
|---|---|---|
| 3,622,846 A | 11/1971 | Reimers |
| 3,656,035 A | 4/1972 | Corman et al. |
| 4,264,943 A | 4/1981 | Anderson et al. |
| 4,536,819 A | 8/1985 | Deutsch .................. 361/274 |
| 5,673,168 A | 9/1997 | Efford et al. .............. 361/518 |

FOREIGN PATENT DOCUMENTS

| | | | |
|---|---|---|---|
| JP | 11176697 A | * | 7/1999 |
| JP | 11329899 A | * | 11/1999 |
| JP | 2000188234 A | * | 7/2000 |
| JP | 2000208366 A | * | 7/2000 |

OTHER PUBLICATIONS

Toroidal Aluminum Electrolytic Capacitor for High Power Inverter and EV Applications Michael D. Weaver 1998.
Further Improving Heat Dissipation for Large Aluminum Electrolytic Capacitors J.L. Stevens et al 1998.

* cited by examiner

*Primary Examiner*—Anthony Dinkins
(74) *Attorney, Agent, or Firm*—Duane Morris LLP

(57) ABSTRACT

The disclosure is for a capacitor cooled by a heat pipe. The capacitor casing is constructed with an open tube inserted through the casing wall and into which is inserted a simple cylindrical heat pipe. The heat pipe may terminate at the casing wall which then acts as a heat transfer surface, or a portion of the heat pipe which extends beyond the end of the capacitor can be attached to an external heat transfer device, such as a heat conductive mounting plate or a cooling fin assembly.

6 Claims, 2 Drawing Sheets

CAPACITOR WITH HEAT PIPE COOLING

BACKGROUND OF THE INVENTION

This patent deals generally with the cooling of capacitors, and more specifically with a capacitor which is cooled by a heat pipe.

It is well understood in the electronics field that the performance and life of capacitors is detrimentally affected by increased temperature. Capacitors normally have a maximum operating temperature, and since observing the maximum temperature is dependent upon removing heat from the capacitor, several devices have been used to cool capacitors.

These heat removal enhancements include removing heat from the external casing of the capacitor by increasing the thermal emissivity of the casing so that more heat will be radiated from the casing, moving air across the surface of the casing, and attaching fins to the casing to increase the surface area for heat transfer.

There have also been several efforts to remove heat from the center core of the typical cylindrical electrolytic capacitor casing. U.S. Pat. No. 4,264,943 to Anderson et al uses a hollow core for the capacitor to increase the surface area exposed to the cooler outside environment. In U.S. Pat. No. 5,673,168 by Efford et al, it is suggested that such a hollow core capacitor casing be cooled by natural or forced convection of a fluid through the hollow core. U.S. Pat. No. 3,622,846 to Reimers discloses building a capacitor on a spool formed from three heat pipes, one as the center core, and the other two as flanges in contact with the ends of the sheets wound around the core.

Each of these cooling arrangements suffers either from limited potential for cooling the capacitor or from high production costs. It would be very beneficial to have an effective means for cooling the core of a capacitor which does not require dramatic changes in the conventional capacitor structure.

SUMMARY OF THE INVENTION

The present invention provides heat pipe cooling for the core of a capacitor with only a simple modification in the structure of the typical capacitor casing.

The conventional capacitor is within an aluminum casing which is about 3 inches in diameter and 5½ inches long. The casing is usually a drawn cup with the bottom and the cylindrical side made from one piece of aluminum, and the electrical terminals protrude from the top of the casing through an electrically insulating disc which seals what would otherwise be the open end of the cup.

The present invention requires only that an aluminum tube be inserted into the casing through the bottom, that the aluminum tube be located on the axis of the cylindrical casing, and that the end of the tube be sealed to the bottom of the casing. The aluminum tube is then used as a spindle for conventional construction of the capacitor by placing a conventional capacitor core around the aluminum tube with layers of foil separated by insulation wound around the core.

Cooling of the capacitor is accomplished by the use of a heat pipe placed within the axial tube and attached by the use of thermally conductive epoxy. The heat pipe casing either terminates at the bottom of the casing, leaving the bottom completely flat, or extends beyond the ends of the casing and is attached to auxiliary cooling devices. With either construction, because of the use of a heat pipe the entire core of the capacitor will be kept at essentially the same temperature as the end of the heat pipe which is being cooled by the casing or other devices.

If the heat pipe terminates at the casing bottom, the casing bottom can be cooled by placing it on a larger structure, such as a cabinet wall or electronic chassis, which conducts the heat away or dissipates the heat from its larger surface area. When the heat pipe extends beyond the casing ends, it can be attached to a fin assembly through which air is moved either by natural or forced convection. The ends of the heat pipe can also be cooled by circulating liquid around them.

The particular benefits of the invention are that it does not require modification of the internal structure of the capacitor or a heat pipe of special construction. The heat pipe used is a simple cylindrical heat pipe which can be manufactured in high quantity and inexpensively. The invention thereby furnishes reliably cooled capacitors at low cost.

DETAILED DESCRIPTION OF THE INVENTION

Figure 1:
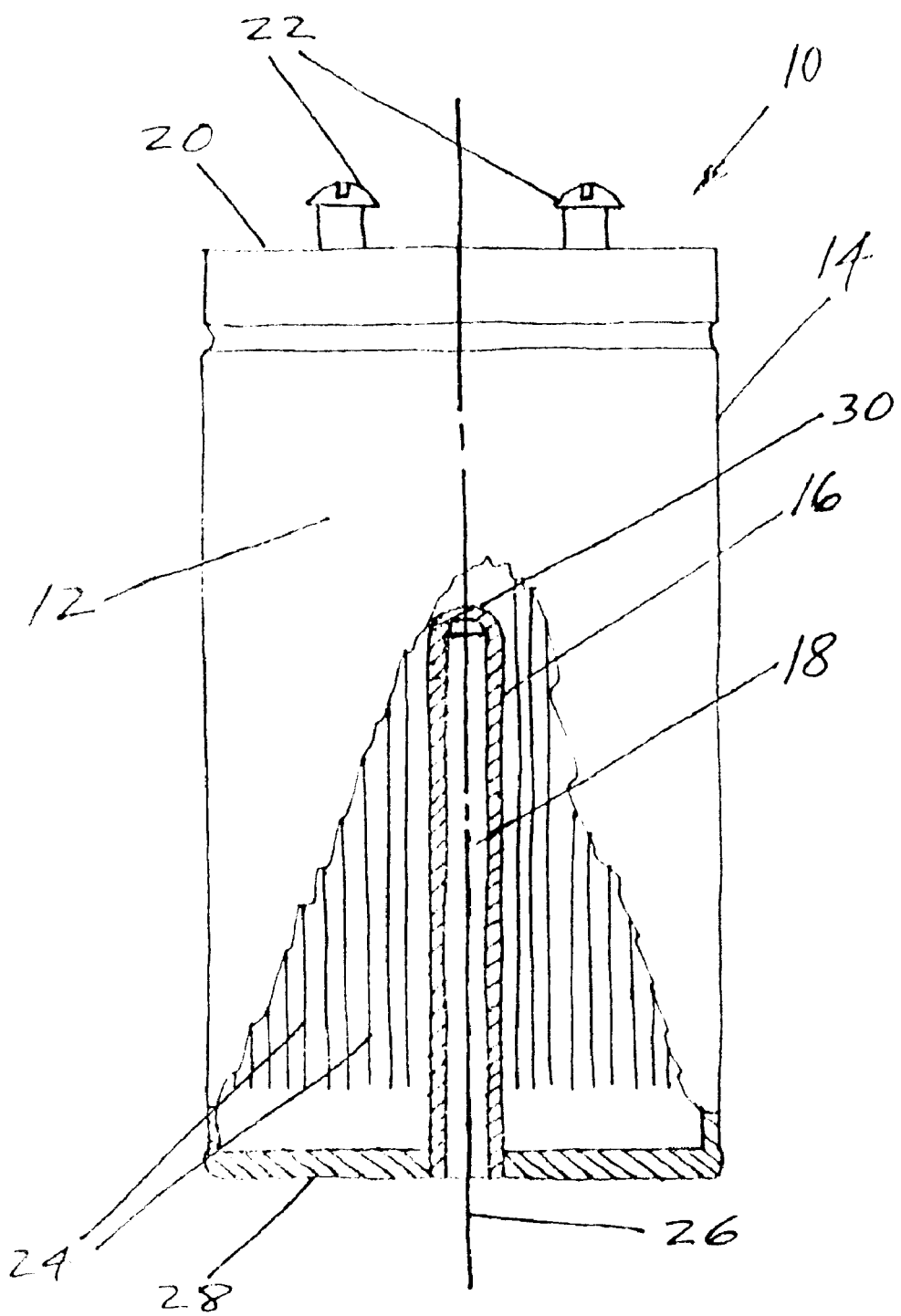
FIG. 1 is a partial cross section view of the preferred embodiment of the invention viewed from the side of a capacitor with part of the side of the casing removed to view the interior and with a heat pipe inserted into the core and attached to the casing bottom.

The FIG. 1 is a partial cross section view of the preferred embodiment of the invention viewed from the side of capacitor 10 with part of side 12 of casing 14 removed to view axial tube 16 and heat pipe 18.

Capacitor casing 14 and side 12 are conventional and made of aluminum which is drawn into a cylindrical cup shape. The open top of the cup is eventually sealed by insulating cover 20 which includes electrical connections 22. The interior of casing 14 includes metal foil separated by insulation (not shown) which is wrapped into a roll that forms plates 24 of capacitor 10.

Capacitor 10 differs from conventional capacitors only because it includes tube 16 inserted into it at its axis 26. Tube 16 which is sealed at its interior end 30 is sealed to bottom 28 of casing 14, preferably by welding or forming tube 16 as an integral part of casing 14, so that tube 16 does not affect the integrity of capacitor 10 which may include material that can leak out.

Cooling of capacitor 10 is then accomplished by inserting standard cylindrical heat pipe 18 into tube 16. Heat pipe 18 is dimensioned to fit closely against the inner surfaces of tube 16, and conventional thermally conductive epoxy is used between heat pipe 18 and tube 16 to bond them together.

With heat pipe 18 installed within capacitor 10 and bonded to all of tube 16 including at casing bottom 28, the temperatures at the center of capacitor 10 along heat pipe 18 will be essentially the same as the temperature of bottom plate 28. Thus, when bottom plate 28 is cooled by attaching it in contact with a heat conductive surface such a metal chassis or cabinet, the center of capacitor 10 is maintained at the same cool temperature as bottom 28.

Figure 2:
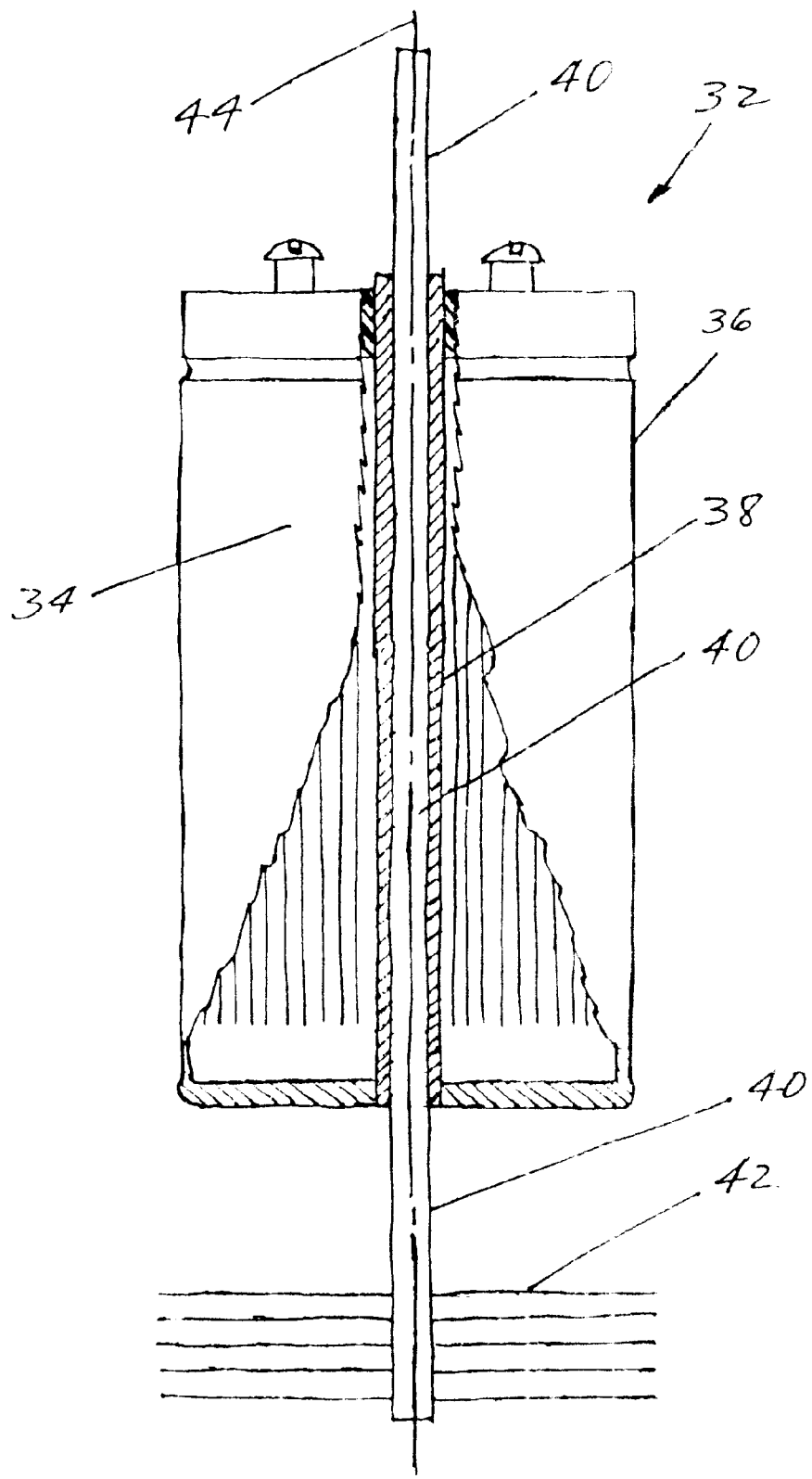
FIG. 2 is an alternate embodiment of the invention viewed from the side of a capacitor with part of the side of the casing removed to view the interior and with a heat pipe passing through the entire capacitor core and attached to heat dissipating fins.

FIG. 2 is an alternate embodiment of the invention viewed from the side of capacitor 32 with part of side 34 of casing 36 removed to view tube 38 and heat pipe 40 passing through capacitor 32 and also attached to heat dissipating fins 42.

Capacitor 32 of FIG. 2 is essentially the same as capacitor 10 shown in FIG. 1 except that in FIG. 2, tube 38, located at axis 44, passes all the way through casing 36. Such a structure permits heat pipe 40 which is bonded to the interior surface of tube 38 to also be attached to external cooling devices such as fins 42. As shown in FIG. 2, heat pipe 40 can extend out either or both ends of capacitor 32, so that cooling devices can be used at either the bottom or the top of the capacitor, depending upon the application within which the capacitor is used.

It should also be appreciated that other cooling devices can be used in place of fins 42. It is not only practical to wrap tubing around heat pipe 40 to water cool it, but it is also possible to attach it to another heat pipe to transfer the heat to a remote location.

A significant advantage of the present invention is the use of conventional cylindrical heat pipes which can be manufactured independently in high quantity. Thus, the heat pipes can be fully tested for quality before being joined to the capacitors. The simple process of bonding the heat pipes into the axial tubes of the capacitors does not require any thermal or vacuum processing, and, as with the heat pipes, the capacitors can also be tested before the heat pipes are assembled into them, so that neither component will be wasted by being assembled with a substandard part.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

What is claimed as new and for which Letters Patent of the United States are desired to be secured is:

1. A capacitor comprising:
   a casing with sides, a top, and a bottom within which the capacitor is enclosed;
   a tube inserted into the casing with the tube sealed to the casing and having an opening at one end; and
   a heat pipe inserted into the opening of the tube and attached to the tube by means of a thermally conductive bond, wherein the tube passes all the way through the casing and has two open ends, and the heat pipe extends out both ends of the tube.

2. The capacitor of claim 1 wherein the casing is cylindrical and the tube is located at the axis of the cylinder.

3. The capacitor of claim 1 wherein the casing and the tube are aluminum.

4. The capacitor of claim 1 wherein the heat pipe is bonded to the tube with a thermally conducting epoxy.

5. The capacitor of claim 1 wherein a heat dissipating means is attached to at least one end of the heat pipe.

6. The capacitor of claim 1 wherein heat dissipating fins are attached to at least one end of the heat pipe.

* * * * *